UNITED STATES PATENT OFFICE.

SOLOMON MARKHAM, OF FLAT ROCK, KANSAS.

IMPROVEMENT IN GRAIN-DRILLS.

Specification forming part of Letters Patent No. 118,621, dated August 29, 1871.

*To all whom it may concern:*

Be it known that I, SOLOMON MARKHAM, of Flat Rock, in the county of Neosho and in the State of Kansas, have invented certain new and useful Improvements in Seed-Sower; and do hereby declare that the following is a full, clear, and exact description thereof, reference being had to the accompanying drawing and to the letters of reference marked thereon making a part of this specification.

The nature of my invention consists in the construction and arrangement of a seed-sower, as will be hereinafter more fully set forth.

In order to enable others skilled in the art to which my invention appertains to make and use the same, I will now proceed to describe its construction and operation, referring to the annexed drawing, in which—

Figure 1:
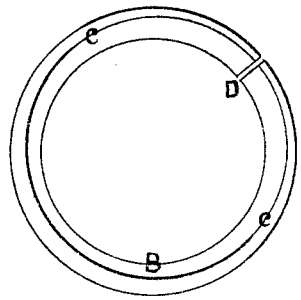
Figure 2:
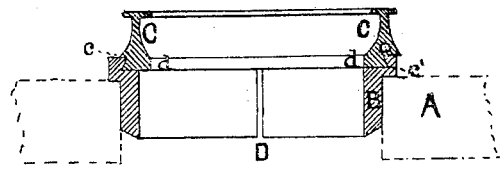
Figure 3:
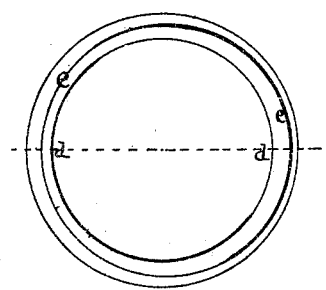
Figure 4:
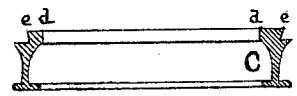

Figure 1 is a longitudinal vertical section, and Fig. 2 is a plan view of my machine.

A represents the main frame of my machine, in the rear part of which is a shaft or axle, B, with a series of wheels, C C, placed upon it. In the front part of the main frame A is pivoted a smaller frame, D, upon the rear part of which are placed the grain-boxes E E. These boxes have suitable openings in their bottoms for the passage of the grain. From said openings tubes $a$ conduct the grain vertically downward to the rear ends of cutters G G, which are arranged in the swinging frame D, as shown in Fig. 1, so as to form a furrow, in which the grain is deposited. Though the seed-boxes E E passes a shaft, $b$, with cogged or toothed wheels $d$ directly over the openings in their bottoms to agitate the seed or grain and cause it to drop through. This shaft with wheels is revolved when the machine is in motion by means of a belt or chain, $e$, passing from a pulley, $f$, upon the axle B, to a double pulley, $f^1$, in the front part of the frame A, and from said double pulley another belt or chain, $e'$, passes to a pulley, $f^2$, on the shaft $b$. The double pulley $f^1$ is placed upon one of the bolts which pivots the small frame D to the main frame, so as to cause the shaft $b$ to revolve whether said small frame is up or down—that is, as the frame D accommodates itself to the unevenness of the ground. On the bottom of the seed-boxes E E is a slide, $i$, operated by means of a lever, $h$, to open or close the openings through which the seed or grain passes. By the same means these openings may be uncovered more or less so as to regulate the amount of seed sown. The wheels C C upon the axle B are arranged so as to be one directly in rear of each cutter, so as to press the grain down and leave a ridge between each row of grain, whereby the grain is kept moist, and instead of, as usual, getting more or less uncovered it gets gradually covered up, and, consequently, protected from the weather. The driver's seat H is arranged above the wheels C C, so as to gain this amount of pressure on the earth. I represents the tongue pivoted in the rear portion of the main frame A and passing through a slotted standard in the front, where it is adjusted to any height desired. In turning or going to and from the field the frame D is raised by means of a windlass, J, and rope or chain $k$, and held, when raised, by a pawl, $m$, acting on the ratchet-wheel $n$.

It will be noticed that in this machine no power is lost, as the only parts which come in contact with the ground perform some portion of the work. There are no wheels merely for supporting the machine; the wheels upon which my machine moves pack the ground over the grain.

The same machine may be used for planting corn or sowing broadcast by merely changing the grain-boxes and wheels, substituting others of suitable construction.

Having thus fully described my invention, what I claim as new, and desire to secure by Letters Patent, is—

The combination of the swinging frame D with the truck-frame A with chain $k$, and raising and locking device J and lever $h$, whereby the operator can raise the swinging frame and shut off the flow of seed, substantially as and for the purpose set forth.

In testimony that I claim the foregoing I have hereunto set my hand this 7th day of August, 1871.

SOLOMON MARKHAM.

Witnesses:
A. N. MARR,
C. L. EVERT.

[102.]

Marsh's Ring & Ring Supporter

No. 118,622.  Patented Aug. 29, 1871.

Witnesses
Jas. H. Conant
Frank L. Parker

Inventor
Thomas Marsh
William Edson Atty